United States Patent [19]

Tezuka

[11] Patent Number: 4,980,777
[45] Date of Patent: Dec. 25, 1990

[54] IMAGE RECORDING APPARATUS

[75] Inventor: Nobuo Tezuka, Kanagawa, Japan

[73] Assignee: Canon Kabushiki Kaisha, Tokyo, Japan

[21] Appl. No.: 414,606

[22] Filed: Sep. 27, 1989

Related U.S. Application Data

[63] Continuation of Ser. No. 129,414, Nov. 25, 1987, abandoned, which is a continuation of Ser. No. 778,390, Sep. 20, 1985, abandoned.

[30] Foreign Application Priority Data

Sep. 21, 1984 [JP] Japan .............................. 59-197865

[51] Int. Cl.⁵ .......................... G01D 15/16; G11B 7/00
[52] U.S. Cl. ................................ 358/302; 346/139 R; 369/117
[58] Field of Search ............... 358/296, 300, 302, 285, 358/335; 346/76 L, 108, 139 R; 369/117

[56] References Cited

U.S. PATENT DOCUMENTS

| | | | |
|---|---|---|---|
| 4,059,841 | 11/1977 | Bricot | 369/117 |
| 4,275,275 | 6/1981 | Bricot | 346/76 L |
| 4,442,462 | 4/1984 | Kimura | 358/335 |
| 4,475,130 | 10/1984 | Miller | 358/302 |

Primary Examiner—Mark J. Reinhart
Attorney, Agent, or Firm—Toren, McGeady & Associates

[57] ABSTRACT

An image recording apparatus which is arranged to convert an optical image into an electrical image signal by an image pick-up and to record the image signal via a recording head on a flexible record bearing medium is provided with a head shifting mechanism which, after the apparatus is triggered, shifts the recording head from a retired position thereof to a recording (or confronting) position relative to the medium in response to the operation of the apparatus performed prior to commencement of an exposure operation by an exposure device performed on the image pick-up.

37 Claims, 3 Drawing Sheets

FIG. 3A RELEASE SIGNAL
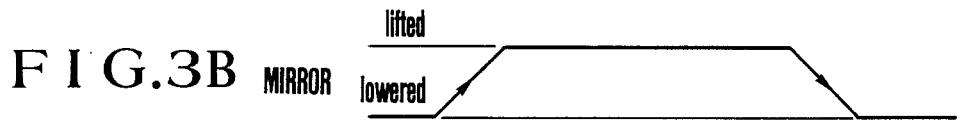
FIG. 3B MIRROR
FIG. 3C MIRROR DOWN SIGNAL
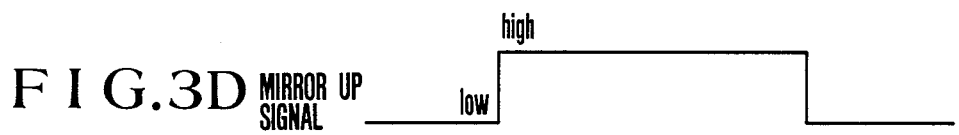
FIG. 3D MIRROR UP SIGNAL
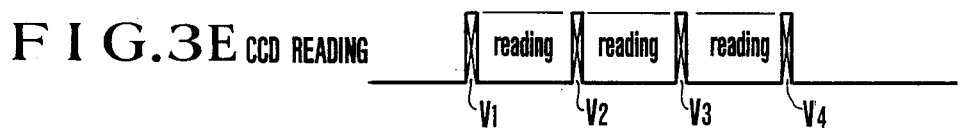
FIG. 3E CCD READING
FIG. 3F SHUTTER
FIG. 3G RECORDING
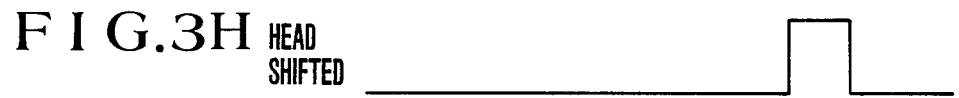
FIG. 3H HEAD SHIFTED
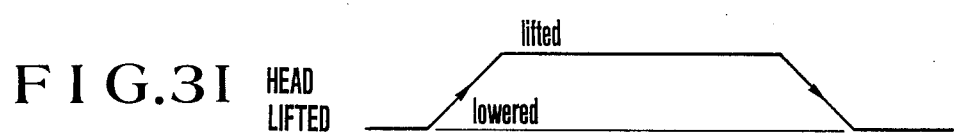
FIG. 3I HEAD LIFTED FIG. 4
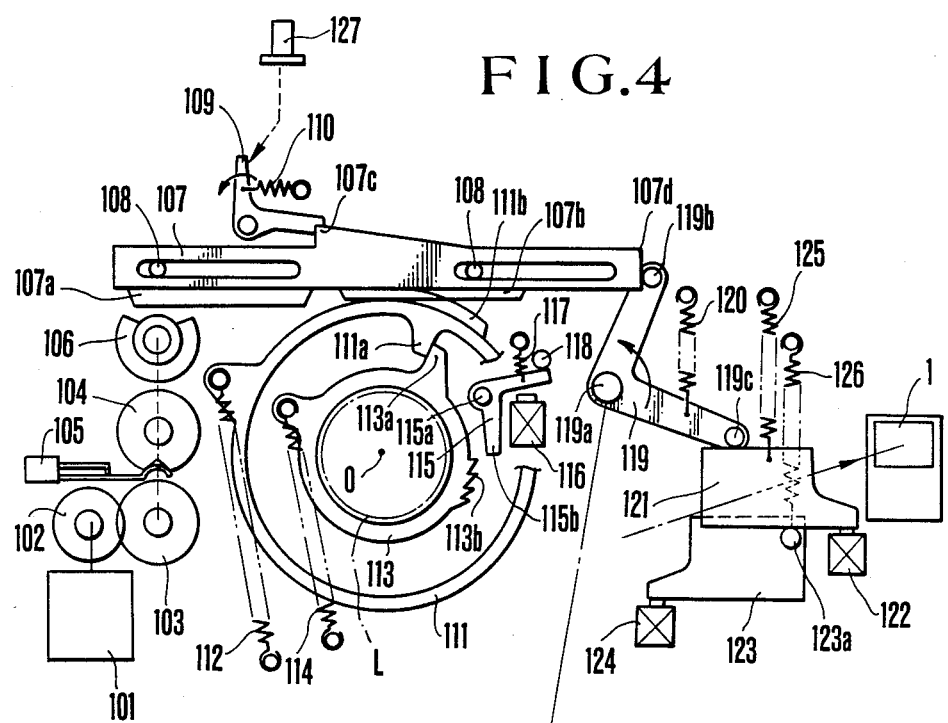
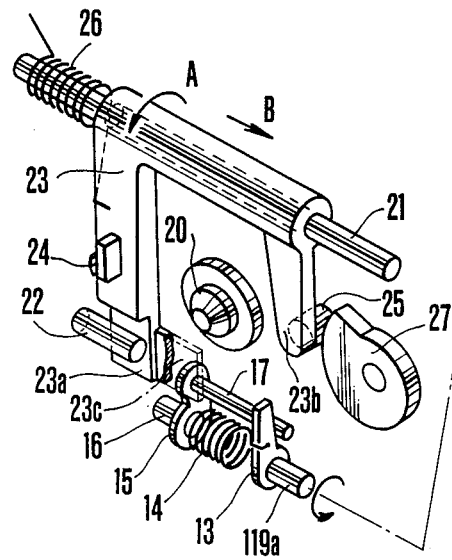

IMAGE RECORDING APPARATUS

This is a continuation application of Ser. No. 07/129,414, filed Nov. 25, 1987, which in turn is a continuation application of Ser. No. 06/778,390, filed Sept. 20, 1985.

BACKGROUND OF THE INVENTION

1. Field of the Invention:

This invention relates to an image recording apparatus arranged to convert an optical image into an electrical image signal by image pick-up means and to record the signal via a recording head onto a flexible record bearing medium.

2. Description of the Prior Art:

During recent years, there have been disclosed various magnetic recording cameras of the kind arranged to convert an optical image into an electrical image signal by means of an image sensor such as a CCD and to magnetically record the converted image signal on a disc-shaped magnetic recording sheet via a magnetic recording head. In a magnetic recording camera of this kind, contact between the magnetic head and the magnetic sheet plays an important role. The term "contact" as used herein for the purpose of the present invention, includes the case where the magnetic head and the magnetic sheet confront each other across an air flow developed as the magnetic sheet travels. Inadequate contact between the sheet and the head causes a loss called spacing loss. The space loss either hinders recording on the magnetic sheet or makes it impossible to transfer adequate magnetic energy to the magnetic sheet.

The degradation of the contact state is attributable not only to the condition of the magnetic head but also much to the deformation of the magnetic sheet and the vibrations of the sheet which takes place when the sheet rotates. The deformation of the magnetic sheet likewise degrades the contact relation between the magnetic sheet and the magnetic head also during a reproducing operation and thus makes it impossible to obtain sufficient reproduction output. In addition to that trouble, the vibrations of a deformed magnetic sheet during its rotation tends to damage the magnetic head.

With the exception of forced deformation caused by an external force, the deformation of a magnetic sheet mostly takes place when the head and the sheet are left in contact with each other over an excessively long period of time with the sheet not driven. To avoid this trouble, it has been proposed to bring the magnetic head and the magnetic sheet into or out of contact with each other in response to an operation on a lock member for a release or trigger button of the camera. More specifically, either the magnetic head or the magnetic sheet is retracted to bring them out of contact with each other when the release or trigger button is locked and to bring them into contact with each other when the release or trigger button is unlocked. In accordance with this arrangement, however, if the release or trigger button is left in an unlocked state over a long period of time, the magnetic sheet would be likewise deformed. The prior art arrangement is, therefore, not satisfactory.

On the other hand, in the case of a magnetic disc recording and reproducing device employed as an external storage device for a computer or the like, the magnetic head is arranged to be brought into contact with the flexible magnetic disc of the device only at the time of recording or reproduction for the purpose of lengthening the service lives of the magnetic disc and the magnetic head and also for preventing the deformation of the magnetic disc. However, if this arrangement is applied as it is to an electronic camera, it necessitates use of an additional drive source, such as a plunger, for moving the magnetic head or the magnetic sheet into or out of contact with each other. Therefore, such arrangement is also unsatisfactory in terms of electric energy consumption and reduction in size of the camera. Besides, the use of such a discrete drive source complicates sequential exposure control operations.

SUMMARY OF THE INVENTION

It is a principal object of this invention to provide, in the light of the background situation described, a novel image recording apparatus which is capable of eliminating the shortcomings of the apparatuses of the prior art.

It is another object of this invention to provide an image recording apparatus which is of the kind recording an image signal obtained by image pick-up means on a flexible record bearing medium via a recording head and is arranged to be capable of effectively preventing the record bearing medium from being deformed by the recording head without recourse to any addition drive source for that purpose.

Under these objects, according to an aspect of the present invention, an image recording apparatus comprises image pick-up means, a recording head for recording on a flexible record bearing medium an image signal produced from the pick-up means, exposure means for exposing the pick-up means to an image light, trigger means, operation means operative in response to the trigger means and in advance of the exposure means, and control means operative in association with the operation means to move the head from a retired position to a recording or confronting position relative to the medium.

The term "operation means" mentioned above may be construed to mean a movable viewing mirror in the event of a single-lens reflex camera or to mean automatic focusing means for an objective in the event of an automatic focusing camera, for example.

The above and further objects and features of the invention will become apparent from the following description of embodiments thereof taken in connection with the accompanying drawings.

BRIEF DESCRIPTION OF THE DRAWINGS

FIGS. 3A to 3I show, in a timing chart, the operation timing of each members included in the camera of FIG. 1 during the operation of the camera.

FIG. 4 is an illustration of the essential parts of an automatic focusing camera to which this invention is applied, as another embodiment thereof.

DETAILED DESCRIPTION OF THE PREFERRED EMBODIMENTS

Figure 1:
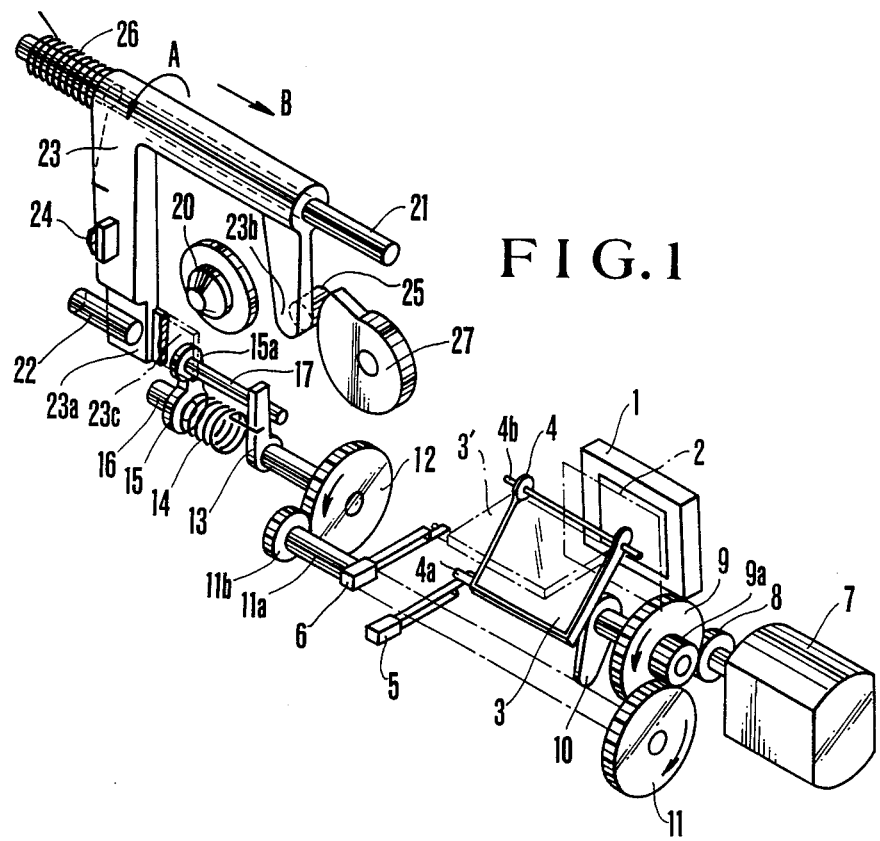
FIG. 1 is an oblique view showing the essential parts of a magnetic recording camera of the single-lens reflex type to which this invention is applied as an embodiment thereof.

An embodiment of this invention is arranged as shown in FIGS. 1 and 2.

Referring to FIG. 1, the embodiment includes a CCD 1 which is employed as image pick-up means; a shutter 2; and a movable reflection mirror 3. The mirror 3 is carried by a mirror frame 4 which is pivotally carried by a shaft 4b. The mirror 3 is thus arranged to take two positions. One is an observation position which is indicated by full lines and in which the mirror guides or reflects a light flux to a view finder optical system which is not shown. The other is a picture taking position and is indicated by one-dot-chain lines in the drawing. In the observation position which is indicated by the full lines, the mirror 3 is kept at an angle of 45 degrees to the axis of incident light by means of a stopper which is not shown. There are provided switches 5 and 6. The former is arranged to produce a signal indicating that the mirror 3 is in the observation position. The latter is arranged to produce a signal indicating the picture taking position of the mirror 3. Both of the switches 5 and 6 are arranged to be operated by a pin 4a provided on the mirror frame 4.

A mirror driving motor 7 serves as a drive source for turning the mirror 3. The driving force of the motor 7 is transmitted via gears 8 and 9 to a mirror drive cam 10 which turns together with the gear 9. The driving force of the motor 7 is also transmitted to another gear 11 via a gear 9a which is arranged to turn together with the gear 9. This driving force is transmitted further to a gear 12 via a shaft 11a and a gear 11b, and further to a drive lever 13 which is arranged to turn together with the gear 12.

A head lifting/lowering lever 15 is pivotally carried by a shaft 16. A pin 17 is provided on one end of the lever 15. Between the head lifting/lowering lever 15 and the drive lever 13 is disposed a spring 14 which has its two ends engaged with the levers 15 and 13. The spring 14 is arranged to cause the levers 13 and 15 to operate like in one body by urging the lever 13 to move clockwise and the lever 15 counterclockwise.

Guide rods 21 and 22 are round bars secured to the camera body which is not shown. The guide rod 21 pivotally and axially slidably carries a head carriage 23. The head carriage 23 has a magnetic head 24 mounted thereon and a cam follower 25 disposed at one end 23b thereof. The head carriage 23 is under an urging force of a spring 26 which urges the carriage 23 to turn on the guide rod 21 counterclockwise or in the direction of arrow A and another urging force which is exerted also by the spring 26 in the axial direction (or in the direction of arrow B) in which the cam follower 25 is pushed against a cam 25 which is described below:

The cam 27 is a head feeding cam which is arranged to be turned by a known drive source such as a stepping motor or the like. The cam 27 turns in such a way as to shift the head carriage 23, that is, the head 24 stepwise to a predetermined extent at a time. A spindle 20 is arranged to rotate a magnetic sheet 31 by the rotation of a motor which is not shown at a predetermined speed of rotation, say, 3600 r.p.m. The magnetic sheet 31 is fitted on the spindle 20 via its center hub.

Figure 2A:
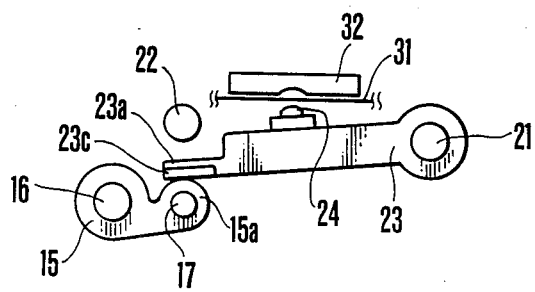
FIGS. 2A and 2B show the head of the camera of FIG. 1 in its lowered position and in its raised position (or a recording position).
Figure 2B:
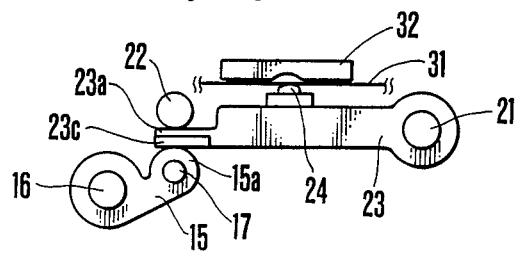

Referring now to FIGS. 2A and 2B, these illustrations include the magnetic sheet 31 and a stabilizer plate 32. The stabilizer plate 32 is opposite to the magnetic head 24 across the magnetic sheet 31 and is arranged to stabilize the sheet 31 relative to the head 24 by preventing the sheet 31 from vibrating.

Referring to FIGS. 1 to 3I, the camera, which is arranged as described above, operates as follows:

When a release or trigger operation is performed on the camera (see FIG. 3A), an exposure determining device which is well known but is not shown determines an apposite shutter time value or an apposite aperture value. Following this, the motor 7 rotates. Then, the gears 9, 11 and 12 turn in the directions of the arrows indicated in FIG. 1. This causes the mirror driving cam 10 to turn counterclockwise to uplift the mirror 3 from the observation position, indicated by the full lines, to the picture taking position, indicated by the one-dot-chain lines (see FIG. 3B). Meanwhile, the motor which is arranged to rotate the spindle 20, during the above-stated processes, comes to rotate the magnetic sheet 31 at the predetermined speed. The CCD 1 also comes to be driven to produce an image pick-up signal in a predetermined cycle, say, 60 Hz as indicated at V1 in FIG. 3E.

Upon arrival of the mirror 3 at the picture taking position (3'), a mirror up completion signal is produced through the switch 6 as indicated in FIG. 3D. In response to this signal, power supplied to the motor 7 is brought to a stop by a circuit which is not shown. Then, the shutter 2 opens in synchronism with a next vertical synchronization signal as indicated at V2 in FIG. 3E. The CCD 1 is thus exposed to light as shown in FIG. 3F.

While the mirror 3 remains in the observation position, indicated by the full lines in FIG. 1, the urging force of the spring 26 causes the head carriage 23 to turn counterclockwise until the lower side of an arm part 23c which extends from the fore end 23a of the head carriage 23 comes to abut on the fore end 15a of the head lifting/lowering lever 15. The magnetic head 24 is then retracted by this and comes out of contact with the magnetic sheet 31. After this, when the mirror 3 ascends or is uplifted as explained above, the lever 13 turns counterclockwise. The head lifting/lowering lever 15, which is unified with the lever 13 by the spring 14, then also turns counterclockwise. With the turning force of the head lifting/lowering lever 15 arranged to be greater than the urging force of the spring 26 in this instance, the head carriage 23 is turned clockwise (or in the direction reverse to the direction of arrow A) on the guide rod 21 as shown in FIG. 2B. The upper side of the fore end 23a of the head carriage 23 then abuts on the other guide rod 22. Under this condition, the head 24 is either brought into contact with or closely opposed to the magnetic sheet (see FIG. 3I).

The rotation of the motor 7 comes to a stop with the mirror 3 uplifted. In this instance, a difference in turning degree between the lever 13 and the head lifting/lowering lever 15 is arranged to be absorbed by the spring 14.

The CCD 1 is exposed to light when the shutter 2 opens (FIG. 3F). Then, an image signal, read out during an ensuing period between V3 and V4 synchronization signals (but inclusive of signal V3) of FIG. 3E, is recorded via the head 24 onto the magnetic sheet 31 (FIG. 3G). After this, a current which causes the motor 7 to rotate backward is applied to the motor 7. At this time, the cam 27 is turned round to shift the head 24 to a next recording position (FIG. 3H). The backward rotation of the motor 7 causes the mirror 3 to descend (FIG. 3B). At the same time, the head lift ing/lowering lever 15 comes from the position shown in FIG. 2B back to the position shown in FIG. 2A. The spring 26 moves the head 24 away from the magnetic sheet 31. Upon completion of the descent of the mirror 3, the switch 5 produces a mirror down completion signal (see FIG. 3C). This signal brings the motor 7 to a stop.

In this specific embodiment, the motor 7 is arranged to be used solely for the purpose of moving the mirror 3 and the head 24 up and down, respectively. However, the motor 7 may be arranged to drive also the iris of the lens which is not shown through the mirror lifting/lowering cam 10. Further, the motor 7 may be utilized for driving the shutter 2 or the head driving cam 27. In this specific embodiment, the head carriage 23 is driven by the cam 27. However, this cam 27 may be replaced with some other suitable means such as a feed screw or the like.

FIG. 4 shows the essential parts of another embodiment of this invention. In the embodiment, the invention is applied to a camera of the type called an automatic focusing camera. In FIG. 4, the same parts as those shown in FIG. 1 are indicated by the same reference numerals and are omitted from the following description. The embodiment includes a motor 101 which is arranged to charge a spring serving as a drive source for a lens barrel and a shutter. The driving force of the motor 101 is transmitted via reduction gears 102 and 103 to a control cam 104 and a cut-away gear 106. A phase detection switch 105 is arranged to cut off power supply to the motor 101 when the control cam 104 and the cut-away gear 106, which turns together with the control cam 104, are caused to make one turn by the motor 101. A slide lever 107 is arranged to be guided by shafts 108. The slide lever 107 is provided with a rack part 107a which is arranged to engage the above-stated cut-away gear 106. The slide lever 107 also has another rack part 107b which is arranged to engage the toothed wheel part 111b of a charge ring 111. The charge ring 111 is urged to turn counterclockwise by a spring 112. The charge ring 111 is provided with a projection 111a for charging the lens barrel 113. The charge ring 111 is turnable round the optical axis O of a focusing lens L.

The lens barrel 113 is urged to turn counterclockwise by means of a spring 114 and is provided with a projection 113a for engagement with the above-stated projection 111a of the charge ring 111. The lens barrel 113 is further provided with a claw part 113b which is arranged to engage a lock pawl 115 when the lens becomes in focus. Although it is not shown, the focusing lens L is arranged to shift along the optical axis O accordingly as the lens barrel 113 turns around. Meanwhile, the CCD 1 is arranged to receive the image of an object which is formed by this focusing lens L.

The lock pawl 115 is urged to turn counterclockwise on a shaft 115a by a spring 117. When power supply is effected to an electromagnet 116 in response to an in-focus signal produced from a known- focus detection device which is not shown, the lock pawl 115 turns clockwise. Then, the fore end 115b of the pawl 115 engages the claw part 113b of the lens barrel 113 to stop the counterclockwise rotation of the lens barrel 113 caused by the spring 114.

A shutter charge lever 119 is urged by a spring 120 to turn counterclockwise on a shaft 119a. A pin 119b which is erected at one end of the lever 119 abuts one end 107d of the above-stated slide lever 107. Another pin 119c, which is erected on the other end of the lever 119, is arranged to abut on a shutter blade 121. The shaft 119a is arranged to turn the lever 13 which has been described in the foregoing with reference to FIG. 1.

Leading and trailing shutter blades 121 and 123 are respectively urged or charged by springs 125 and 126. The trailing shutter blade 123 is provided with a pin 123a which is arranged to abut on the lower end of the leading shutter blade 121. There are provided electromagnets 122 and 124 for controlling the leading and trailing shutter blades 121 and 123, respectively. With the shutter arranged in this manner, the CCD 1 is exposed to light under the control of a shutter control circuit which is not shown.

A clamp lever 109 is arranged to engage the hook part 107c of the above-stated slide lever 107. A spring 110 is arranged to urge the clamp lever 109. The camera is provided with a release or trigger button 127.

The camera which is arranged as described above, operates as described below:

FIG. 4 shows the camera as in a state of having completed a charging operation. When the camera release or trigger button 127 is operated under this condition, the spindle 20 begins to rotate. At that moment, the head 24 is in the state as shown in FIG. 2A. Then, the release operation causes the clamp lever 109 to be turned against the force of the spring 110. The lever 109 is thus disengaged from the hook part 107c of the slide lever 107. The urging force of the spring 112 then causes the charge ring 111 to turn counterclockwise. The slide lever 107 moves to the left accordingly as the ring 111 turns. The spring 120 then causes the shutter charge lever 119 to turn counterclockwise. This releases the leading shutter blade 21 from a state of being pressed by the pin 119c of the shutter charge lever 119. Meanwhile, the head lifting /lowering lever 15 is caused, via the shaft 119a of the lever 119 to also turn counterclockwise. The lever 15 thus brings the head 24 either into contact with the magnetic sheet 31 or into a position closely opposed to the latter. Under this condition, the leading and trailing shutter blades 121 and 123 are respectively carried by the electromagnets 122 and 124.

At that time, the lens barrel 113 is also caused to turn counterclockwise by the force of the spring 114. The lens L is shifted by this, for example, from a nearest distance focusing position toward an infinity distance focusing position. Upon arrival of the lens L at an in-focus point for an object to be photographed, a circuit which is not shown allows power to be supplied to the electromagnet 116. With the electromagnet 116 thus energized, the lock pawl 115 brings the turning movement of the lens barrel 113 to a stop. The focusing lens L is thus set in its in-focus position.

Then, at a timing for reading out from the CCD 1, i.e. in accordance with the vertical synchronizing signal, power supply to the electromagnet 122, which is carrying the leading shutter blade 121, is cut off. After the lapse of a controlled length of time from this, power supply to the other electromagnet 124, which is carrying the trailing shutter blade 123, is cut off. The CCD 1 then ceases to be exposed to light. An image signal read out from the CCD 1 is recorded via the head 24 onto the magnetic sheet 31. Upon completion of recording, the head carriage 23 is shifted to a next recording position. At that point of time, power supply is effected to the motor 101 and again there obtains the condition of FIG. 4. The magnetic head 24 then resumes the position as shown in FIG. 2A.

More specifically, with the motor 101 rotated, the rotation of the motor 101 moves the slide lever 107 to the right as viewed in the drawing via the gears 102 to 104 and 106. The rack part 107b of the slide lever 107 then causes the lens barrel charge ring 111 to turn clockwise against the force of the spring 112 and also causes the shutter charge lever 119 likewise to turn clockwise against the force of the spring 120. As a result, the lens barrel 113 comes to turn clockwise against the force of the spring 114. The focusing lens L is then shifted toward the nearest distance focusing position. Meanwhile, the shutter blades 121 and 123 are moved down against the forces of the springs 125 and 126, respectively. At this time, the clockwise turning of the shutter charge lever 119 causes the drive lever 13 to turn clockwise. Therefore, the head lifting/lowering lever 15 also turns in the same direction. As a result, as shown in FIG. 2A, the head 24 is retracted away from the magnetic sheet 31 by the force of the spring 26. The clamp lever 109 then comes to engage the hook part 107c of the slide lever 107 under the action of the spring 110. The gear 104 comes to complete just one turn at this point of time. This closes the switch 105 which has been open. With the switch 105 closed, the motor 101 comes to a stop. Then, there obtains the condition as shown in the drawing.

In the specific embodiment shown in FIG. 4, the shutter is a slit type shutter which consists of two blades. However, this shutter of course may be replaced with a shutter of the type called a half-open type shutter.

In accordance with this invention as described in detail in the foregoing, an image recording apparatus of the kind arranged to record, via a recording head, an image signal which is obtained by image pick-up means onto a flexible recording medium can be arranged to effectively prevent the recording head from deforming the recording medium with relatively simple arrangement without having recourse to any additional drive source. Therefore, the invention is quite advantageous for an apparatus of the above-stated kind.

Further, the two embodiments of the invention described may be modified in the following manner: The spring 26 is arranged to urge the head carriage 23 to turn clockwise on the guide rod 21 in a direction reverse to the direction of arrow as indicated in FIG. 1 or 4. On the other hand, the head lifting/lowering lever 15 is arranged to act on the front side of the arm part 23c of the head carriage 23 instead of acting on the reverse side of the arm part. Then, when the head carriage 23 is in the state of FIG. 2B under the urging force of the spring 26, the head carriage 23 can be retracted into the state of FIG. 2A against the force of the spring 26 by the clockwise turn of the lifting/lowering lever 15 following the clockwise turn of the lever 13. In another mofification for further simplification, while the spring 26 is arranged to urge the head carriage 23 to turn clockwise on the guide rod 21, the lever 13 is arranged to have an arm part thereof act directly on the front side of the arm part 23c of the head carriage 23 in such a manner that: With the head carriage 23 in the state of FIG. 2B under the urging force of the spring 26, the head carriage 23 can be retracted to its position as shown in FIG. 2A via the arm part of the lever 13 by the clockwise turn of the lever 13. This arrangement dispenses with the lifting/lowering lever 15 and the spring 14.

The present invention is not limited in its application to the specific embodiments described but may be otherwise variously embodied and applied to apparatuses of different kinds within the spirit and scope of the following claims.

What is claimed is:

1. An image recording apparatus for recording image signals on a flexible record bearing medium, comprising:
   (A) image pick-up means for producing an electrical image signal in response to an optical image;
   (B) a recording head for recording the image signal produced from said pick-up means on the medium;
   (C) head loading means for moving said recording head between a loading position in which said head is accessible to a surface of the recording medium and said image signal is recordable, and an unloading position in which said recording head is retired from the surface of the recording medium;
   (D) exposure means for exposing said pick-up means to the optical image;
   (E) trigger means for generating a timing for starting said exposure means;
   (F) operation means for driving said exposure means in response to said trigger means; and
   (G) control means operative in association with said operation means to control said head means to move said head, relative to the medium, from the unloading position to the loading position and to return said head to the unloading position upon completion of recording.

2. The apparatus according to claim 1, wherein said operation means includes;
   a mirror member movable between a first position in an optical path of the optical image and a second position out of the optical path; and
   drive means responsive to said trigger means to move said mirror member from said first to said second positions;
   said control means being operatively connected with said drive means.

3. The apparatus according to claim 2, wherein said drive means includes a motor.

4. The apparatus according to claim 2, wherein said drive means is arranged to move said mirror member from said second to said first positions after the completion of signal recording by said head; and said control means being arranged to move the head from said recording to said retired positions when said drive means moves said mirror member from said second to said first positions.

5. The apparatus according to claim 1, wherein said operation means includes:
   a focus adjustable lens for forming an object image on said pick-up means; and
   an automatic focusing means for automatically focusing said lens;
   said control means being operatively connected with said automatic focusing means.

6. The apparatus according to claim 5, wherein said automatic focusing means is arranged to move said lens from a predetermined position in a predetermined direction until an in-focus condition of the lens is attained; and said control means is arranged to move said head from said retired to said recording positions when said focusing means moves said lens from said predetermined position.

7. The apparatus according to claim 6, wherein said automatic focusing means is arranged to reset said lens at said predetermined position after the completion of signal recording by said head; and said control means is arranged to move the head from said recording to said retired positions when said focusing means resets said lens at said predetermined position.

8. The apparatus according to claim 7, wherein said automatic focusing means includes:
   a spring member for moving said lens from said predetermined position in said predetermined direction; and
   a motor for resetting said lens at said predetermined position;
   said spring being arranged to be charged with an urging force when said lens is reset by said motor.

9. The apparatus according to claim 1, further comprising:
   a carriage guide;
   a head carriage for carrying said head, said carriage being guided by said carriage guide and rotatable about the carriage guide; and
   moving means for moving said head carriage along said carriage guide;
   said control means being arranged to rotate said head carriage about said carriage guide to move said head between said retired and said recording positions.

10. The apparatus according to claim 9, wherein said control means includes:
    an urging member for urging said head carriage to rotate about said carriage guide to retire said head from the medium; and
    pressure means operative in association with said operation means for pressing said head carriage against said urging member to move said head from said retired to said recording positions.

11. The apparatus according to claim 9, wherein said control means includes:
    an urging member for urging said head carriage to rotate about said carriage guide to move the head from said retired to said recording positions;
    pressure means for pressing said head carriage against said urging member to retire the head from the medium; and
    release means operative in association with said operation means for releasing the pressing of said head carriage by said pressure means and for causing said urging member to rotate about said carriage guide.

12. An image pick-up device, comprising:
    (a) image pick-up means for converting an optical image into an electrical signal;
    (b) recording means for recording an output of said image pick-up means, said recording means including a recording medium and a recording head which is movable between a recording position in which said recording head can effect a recording operation on said recording medium and an inoperative position in which said recording head does not effect the recording operation;
    (c) trigger means for initiating a predetermined image pick-up operation;
    (d) optical control means for controlling incidence of said optical image on said image pick-up means; and
    (e) common drive means for initiating the control of the incidence of said optical image on said image pick-up means by said optical control means in response to the output of said trigger means, and for driving said recording means so as to change a relative positional relation between said had and said medium to move said head at the recording position during said control.

13. An image pick-up device according to claim 12, wherein said optical control means includes a mirror.

14. An image pick-up device according to claim 12, wherein said optical control means is able to control formation of the optical image incident on said image pick-up means.

15. An image pick-up device according to claim 12, wherein said optical control means includes a shutter.

16. An image pick-up device according to claim 12, wherein said optical control means includes a diaphragm.

17. An image pick-up device according to claim 12, wherein said common drive means is able to drive said recording head so as to change the distance between said head and said recording medium.

18. An image pick-up device according to claim 12, wherein said common drive means includes a motor.

19. An image pick-up device according to claim 12, wherein said common drive means drives said recording head in association with the drive of said optical control means.

20. An image pick-up device according to claim 19, wherein said common drive means moves said recording head from a third position to a fourth position in association with movement of said optical control means from a first position to a second position.

21. An image pick-up device according to claim 20, wherein said common drive means moves said recording head from the fourth position to the third position in association with movement of said optical control means from the second position to the first position.

22. An image pick-up device according to claim 21, wherein said first position is a position at which the optical image is not incident on the image pick-up means, and the second position is a position at which the image is incident on the image pick-up means.

23. An image pick-up device according to claim 22, wherein said third position is a position at which the head and the medium are separate from each other, and said fourth position is a position at which the head and the medium are close to each other so as to enable recording.

24. An image pick-up device, comprising:
    (a) image pick-up means for converting an optical image into an electrical signal;
    (b) image pick-up control means for making an image of an object incident on said image pick-up means for a predetermined period of time; and
    (c) shift means for shifting a recording head to a recording medium so as to shift the recording head to a position wherein recording by the head onto said recording medium is possible from a retired position where the head is retired from the surface of the recording medium, in response to operation of said image pick-up control means.

25. An image pick-up device according to claim 24, further comprising drive means for commonly driving said image pick-up control means and said shift means.

26. An image pick-up device according to claim 24, wherein said image pick-up control means includes a mirror.

27. An image pick-up device according to claim 24, wherein said image pick-up control means includes a shutter.

28. An image pick-up device according to claim 24, wherein said image pick-up control means includes a diaphragm.

29. An image pick-up device according to claim 24, wherein said image pick-up control means includes a member for changing the formation of the optical image.

30. An image pick-up device according to one any of claims 24 to 29, further comprising trigger means for initiating the operation of said image pick-up control means.

31. An image pick-up device, comprising:
   (a) image pick-up means for converting an optical image into an electrical signal;
   (b) optical control means for making an image of an object incident on said image pick-up means for a predetermined period of time;
   (c) trigger means for initiating a predetermined image pick-up operation;
   (d) recording means for recording an output of said image pick-up means, said recording means including shift means for shifting a recording head relative to a recording medium, said shift means shifting said head to a stand-by position close to said recording medium loaded in a predetermined loaded position but disabling the recording according to loading of said recording medium to said predetermined loaded position, and in recording shifting said head to a recording position on the recording medium from said stand-by position so as to enable the recording on said recording medium by said head, said recording means being arranged to return said recording medium to said stand-by position upon completion of recording on said recording medium by said head; and
   (e) drive means for commonly driving both said optical control means and said shift means in cooperative relation with each other in a predetermined sequence.

32. An image pick-up device according to claim 31, wherein said optical control means includes a mirror.

33. An image pick-up device according to claim 31, wherein said optical control means is able to control formation of the optical image incident on said image pick-up means.

34. An image pick-up device according to claim 31, wherein said optical control means includes a shutter.

35. An image pick-up device according to claim 31, wherein said optical control means includes a diaphragm.

36. An image pick-up device according to claim 31, wherein said common drive means includes a motor.

37. An image pick-up device according to claim 31, wherein said common drive means drives said recording head to said recording medium in association with the drive of said optical control means.

* * * * *